Patented May 7, 1940

2,199,786

UNITED STATES PATENT OFFICE 2,199,786

EXTRACTION OF PHENOLS

Alfred Dierichs and Hans Martini, Leverkusen-Wiesdorf, Rhine, Germany, assignors to I. G. Farbenindustrie Aktiengesellschaft, Frankfort-on-the-Main, Germany No Drawing. Application October 12, 1938, Serial No. 234,622. In Germany October 14, 1937

4 Claims. (Cl. 260—627)

The present invention relates to the extraction of phenols from their aqueous solutions.

Phenols such as phenol itself or the cresols, xylenols and similar products possess a certain solubility and miscibility with water. It is a problem to remove the phenols from their aqueous solutions or suspensions for the purpose of recovering the same for further utilization and for the purpose of freeing the waste liquors from all contaminations having a phenolic character. This is true in case of gas-liquors of coke ovens, low temperature carbonization plants, hydrogenation plants and, in general, of all operations in which pit-coal or lignite, etc., are partly or completely gasified; in the waste liquors obtained thereby the "phenols" are present in admixture with ammonia and other substances of a basic character such as amines, pyridines and their homologues and other nitrogen derivatives. Also in case of preparing phenols by hydrolysis of benzene sulfonic acids or halogen benzenes there are obtained waste liquors having phenols dissolved therein in a low concentration. In all these cases these contaminations are a source of great inconvenience on account of their poisonous nature and (especially in case of the gas liquors) of their smell. The elimination of the phenols from such waste liquors and the avoiding of losses of these valuable substances form a grave problem in many respects.

We are aware of the fact that many attempts have been made at the removal of the phenols from such waste liquors by means of various extracting agents. Our comparative tests have proved that the new extracting agents which will be more fully described in the following are superior to all those hitherto employed.

In accordance with the present invention liquid esters of carboxylic acids are brought into intimate contact with liquors containing phenols. Those carboxylic acid esters are preferred the boiling point of which is sufficiently below the boiling point of phenols for easily allowing separation of the esters from the phenols by distillation. Absorption of the phenols by the said esters readily occurs and the esters loaded with the phenols easily separate from the purified waste liquors owing to their insolubility in water. The esters are then separated from the phenols by distillation. As esters there are preferably employed acetic acid ethyl and acetic acid butyl ester. Those amounts of the extracting agents which remain dissolved in the water may be recovered therefrom by vapor distillation. This recovering process is necessary in case of acetic acid ethyl ester, whereas in case of the butyl ester the recovering process may be dispensed with owing to the low solubility of the ester in water. The esters can be also recovered by means of active carbon or by salting out.

A modification of our invention consists in that the esters are employed in admixture with such solvents as are miscible therewith but are practically insoluble in water. Examples for such auxiliary agents are benzene, toluene and the like.

The new process can be applied to every waste liquor containing phenols regardless as to whether the freeing of the liquors from contaminations or the recovering of the phenols is intended. Our invention is based on the discovery that the esters effect a considerable decrease of the surface tension. In consequence thereof and in view of their relatively low specific gravity and of their low solubility in water our new extracting agents allow an easy separation of the layers by gravity without the formation of foam. Moreover, they are excellent solvents for the phenols. Comparative tests have shown that from a 2% aqueous solution of phenol containing some common salt, if extracted with 10% (calculated upon the weight of the solution) of various extracting agents, benzene removes 25-30% of the phenols, chlorobenzene about 50%, whereas acetic acid ethyl ester removes about 94% of the phenols.

In view of the quick separation of layers which is secured by the use of the said esters the extracting process can be performed continuously. This can be effected in a manner known per se by causing the waste liquors to enter a tower on the top and allowing the esters to enter from the bottom. In this manner an intimate contact of both liquids, i. e., the waste liquor and the extracting agent is secured as the former having a higher specific gravity sinks down, whereas the latter rises up in small bubbles.

The following examples illustrate the present invention without, however, restricting it thereto:

*Example 1*

1 liter of a waste liquor containing 17.5 gs. of phenol are shaken with 100 ccms. of acetic acid ethyl ester and allowed to stand for a short time. Separation of the watery layer and of the acetic ester occurs quickly. The acetic ester now contains 16.4 gs. of phenol (corresponding to 93.5% of the amount of phenol which was dissolved in the water). If the waste liquor remaining after extraction is once more shaken with 100 ccms. of a fresh acetic acid ethyl ester there are removed from the former further 1.07 gs. (corresponding to 6.1%) of phenol, whereas the water still contains 0.03 g. of phenol per liter. By working in a tower as described above the phenol can be removed nearly quantitatively. The ester which has been dissolved by the water can be removed by blowing in a current of steam.

*Example 2*

If acetic acid butyl ester is employed under the same conditions as described in the preceding example there is obtained after two extracting operations a yield of phenol of about 99%, the amount of phenol which has remained dissolved in the water being 0.17 g. per liter. Also in this case the phenol can be quantitatively removed by working in a tower. The amount of butyl ester which has remained dissolved in the water is only 0.5 g. per liter which can be easily recovered by vapor distillation.

*Example 3*

1 liter of a waste liquor containing 18 gs. of phenol are shaken with 100 ccms. of a mixture of equal parts of acetic acid butyl ester and benzene. By the first extraction there are recovered 81% of the phenol, further 12.5% by the second extraction and further 5.7% of the third extraction so that there are recovered in this manner 99.2% of the phenol, the waste liquor containing after extraction only 0.15 g. of phenol per liter.

We claim:

1. The extraction of phenols from their aqueous solutions by contacting the said solutions with liquid esters of carboxylic acids the boiling point of which is sufficiently below the boiling point of the phenols for allowing separation of the esters from the phenols by distillation.

2. The process as claimed in claim 1 wherein acetic acid ethyl ester is employed for the extraction.

3. The process as claimed in claim 1 wherein acetic acid butyl ester is employed for the extraction.

4. The extraction of phenols from their aqueous solutions by contacting the said solutions with acetic acid esters the alkyl radicals of which contain up to four carbon atoms, separating the esters from the phenols after extraction by distillation, and separating the esters which have been dissolved by the water by vapor distillation and re-using the esters for the extraction.

ALFRED DIERICHS.
HANS MARTINI.